US006208533B1

(12) United States Patent
Ogawa

(10) Patent No.: US 6,208,533 B1
(45) Date of Patent: Mar. 27, 2001

(54) SWITCHING POWER SUPPLY FOR STABILIZING A DC OUTPUT VOLTAGE

(75) Inventor: Takahiro Ogawa, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/487,260

(22) Filed: Jan. 19, 2000

(30) Foreign Application Priority Data

Jan. 19, 1999 (JP) ................................................. 11-010955

(51) Int. Cl.[7] .............................................. H02M 3/335
(52) U.S. Cl. ............................................ 363/21; 363/131
(58) Field of Search ................................. 363/20, 21, 56, 363/97, 131

(56) References Cited

U.S. PATENT DOCUMENTS 4,327,404 * 4/1982 Horiguchi .............................. 363/19
5,063,491 * 11/1991 Shigeo .................................. 363/56
5,909,363 * 6/1999 Yoon .................................... 363/21
5,917,714 * 6/1999 Ogawa .................................. 363/20
5,917,716 * 6/1999 Cho ...................................... 363/21
5,952,795 * 9/1999 Kofune et al. ....................... 315/411

FOREIGN PATENT DOCUMENTS 7-163143   6/1995  (JP) .

* cited by examiner

Primary Examiner—Adolf Deneke Berhane
(74) Attorney, Agent, or Firm—Evenson, McKeown, Edwards & Lenahan, P.L.L.C.

(57) ABSTRACT

A switching power supply to stabilize the voltage of a DC output by controlling the switching of a switching transistor according to a voltage error of the DC output. In the switching power supply, when the switching transistor carries out the intermittent switching, the maximum value of the current flowing through a primary coil is limited to a current value smaller than the maximum value of the current determined corresponding to the output of an error detection circuit.

4 Claims, 4 Drawing Sheets

SWITCHING POWER SUPPLY FOR STABILIZING A DC OUTPUT VOLTAGE

BACKGROUND OF THE INVENTION

1. Field of the Invention

The present invention relates to a switching power supply to stabilize the voltage of a DC output by controlling the switching of a switching transistor according to a voltage error of the DC output, and in more detail, to a switching power supply, in which, when the switching transistor conducts the intermittent switching, the maximum value of a current of the switching transistor is limited to a current value smaller than the current value determined by the output of an error detection circuit.

2. Description of the Related Art

There is an RCC type switching power supply as one of switching power supplies for use in a power supply section of a television receiver. However, in the RCC type switching power supply, when the electric power consumed on the secondary side is smaller than the electric power supplied by the primary side because the load is greatly lightened, the intermittent switching in which switching is stopped at a period of several mS to several 100 μS, occurs. Accordingly, a disadvantage that unpleasant oscillation noise in the audio band is generated from the transformer, occurs.

A conventional technique to solve such a disadvantage is proposed in Japanese Patent Unexamined Publication No. Hei. 7-163143. That is, in this technique, a second oscillation stop command section to intermittently drive the switching circuit at a set period out of the audio range when a standby signal showing the stoppage of the supply of the electric power to the load is sent out, is provided. Accordingly, the switching circuit conducts an intermittent switching operation whose period is forced, according to the output of the second oscillation stop command section. Accordingly, because the period of the intermittence is the period out of the audio band, the oscillation noise generated from the transformer becomes also the frequency out of the audio band, thereby, the unpleasant oscillation noise is prevented from generating.

However, when the above structure is used, the following problems occur. That is, the period when the second oscillation stop command section intermittently drives the switching circuit, is set by a time constant circuit composed of a smoothing capacitor and a resistor for a time constant. Accordingly, in order to put the period of the intermittent drive out of the audio band, it is necessary to reduce the time constant. On one hand, in order to reduce the time constant, there are two methods; one in which the capacity of the smoothing capacitor is reduced, and the other in which the resistance value is reduced. However, in the case where the capacity of the smoothing capacitor is reduced, when a predetermined current is supplied to the load, the capacity of the capacitor is insufficient, and a DC output having a lot of ripples is supplied to the load. On the other hand, in the case where the resistance value is reduced, because the current value flowing to the resistor is increased, a problem occurs that a loss is increased.

SUMMARY OF THE INVENTION

The present invention has been made to solve the above problems, and an object of the invention is to provide a switching power supply by which, in the case where the switching transistor conducts the intermittent switching, even when the oscillation noise of the transformer is in the audio band, the oscillation noise of the transformer can be made so as to be inaudible.

In order to achieve the above object, according to the invention, there is provided a switching power supply comprising: a switching transistor for switching a current flowing through a primary coil wound around a transformer; a rectifying and smoothing circuit for rectifying and smoothing an output of a secondary coil wound around the transformer; and an error detection circuit for detecting a voltage error of a DC output sent from the rectifying and smoothing circuit, wherein a voltage of the DC output is stabilized by controlling the switching of the switching transistor according to an output of the error detection circuit, and wherein when the switching transistor conducts an intermittent switching, a maximum value of the current flowing through the primary coil is limited to a current value smaller than a maximum value of a current determined corresponding to the output of the error detection circuit.

That is, when the maximum value of the current flowing through the primary coil is reduced, the force to oscillate the transformer is reduced. Therefore, the sound volume of the oscillation noise generated from the transformer is reduced.

DETAILED DESCRITION OF THE PREFERRED EMBODIMENTS

Figure 1:
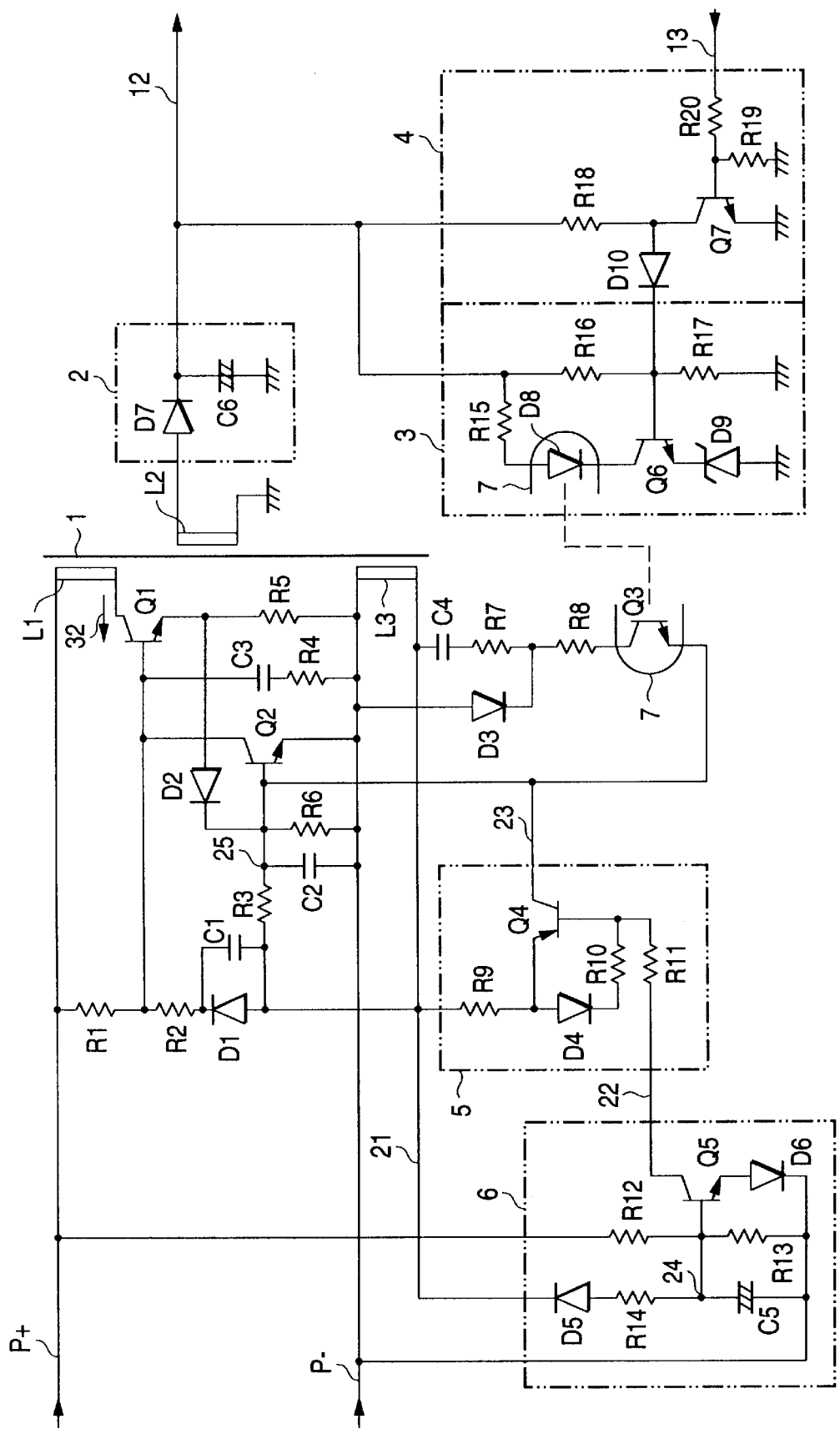
FIG. 1 is a circuit diagram showing the electrical connection of a first embodiment of the switching power supply according to the present invention.

Referring to the drawings, the embodiments of the present invention will be described below.

FIG. 1 is a circuit diagram showing the electric connection of the first embodiment of the switching power supply according to the present invention.

The present embodiment is an RCC type switching power supply, wherein an auxiliary coil L3 applies positive feedback onto a switching transistor Q1, and is wound around a transformer 1. The switching power supply is structured such that the voltage of a DC output 12 is stabilized by controlling the switching of the switching transistor Q1 according to an output of an error detection circuit 3 to detect a voltage error of the DC output 12. Therefore, a control transistor Q2 to control an input signal introduced to a base of the switching transistor Q1, is provided. Further, an output of the error detection circuit 3 is introduced to a base (the input terminal recited in claims) of the control transistor Q2.

When the switching of the current flowing through a primary coil L1 of the transformer 1, is conducted, a block 2 composed of a diode D7 and a capacitor C6, forms a rectifying and smoothing circuit to rectify and smooth an output sent from a secondary coil L2. A block composed of a transistor Q6, a light emitting diode D8, a Zener diode D9, and three resistors R15–R17, forms the error detection circuit 3 to detect the voltage error of the DC output 12. Then, the detected voltage error is sent to the base of the control transistor Q2 through a phototransistor Q3.

A block 4 composed of a transistor Q7, a diode D10, and three resistors R18–R20, forms a step-down instruction circuit to lower the voltage of the DC output 12 to about ⅓ voltage, when the operation of a load apparatus (for example, a television set) is stopped. Therefore, when an output 13 from a microcomputer to control the load apparatus is on an L level showing the operation stop (on standby state), the step-down instruction circuit 4 changes a voltage dividing ratio of the voltage dividing circuit provided in the error detection circuit 3.

A block 5 composed of a transistor Q4, a diode D4, and three resistors R9–R11, forms an auxiliary control circuit, and at the time of the intermittent switching, changes the timing at which the switching transistor Q1 is shifted to the off-state, to the timing earlier than the timing corresponding to the output of the photocoupler 7 (output of the error detection circuit 3). That is, when an intermittent signal 22 is supplied from an intermittence detection circuit 6 to the auxiliary control circuit 5, the circuit 5 sends an auxiliary control signal 23 to the base of the control transistor Q2, and advances the timing at which the transistor Q2 is turned on. Accordingly, the control transistor Q2 advances the timing at which the switching transistor Q1 is turned off.

A block composed of a transistor Q5, a diode D5, a capacitor C5, and three resistors R12–R14, forms the intermittence detection circuit 6 which detects whether the switching transistor Q1 conducts the intermittent switching, according to the voltage generated in the auxiliary coil L3, when the switching transistor Q1 is turned off. Then, when it is detected that the switching transistor Q1 conducts the intermittent switching, the detection circuit 6 sends the intermittent signal 22 to the auxiliary control circuit 5.

When the embodiment structured as described above is more detailed, a DC input P+ and a DC input P− are DC sources obtained by rectifying and smoothing the commercial power source. Accordingly, the DC input P+ is guided to one terminal of the primary coil L1. The other terminal of the primary coil L1 is connected to a collector of the switching transistor Q1. Further, an emitter of the switching transistor Q1 is connected to the DC input P− through the resistor R5 for detecting the emitter current as the voltage.

A resistor R1 whose one terminal is connected to the DC input P+, is an element to supply the starting current to the switching transistor Q1. Therefore, the other terminal of the resistor R1 is connected to the base of the switching transistor Q1. Further, a serial circuit composed of a capacitor C3 and a resistor R4 is connected between the base and emitter of the switching transistor Q1 so that the intermittent switching can be easily generated when the load becomes greatly light.

The control transistor Q2 is an element to stabilize the voltage of the DC output 12 by shifting the switching transistor Q1 from the on-state to the off-state at the timing according to the output showing the voltage error which is sent from the error detection circuit 3. Therefore, the collector of the control transistor Q2 is connected to the base of the switching transistor Q1. Further, the emitter of the phototransistor Q3 is connected to the base of the control transistor Q2.

Further, a capacitor C2 is connected between the base of the control transistor Q2 and the DC input P− so that the rise of the potential of the base is slowed down. A resistor R6 is connected in parallel to the capacitor C2 so that electric charges of the capacitor C2 is discharged. Further, in order to limit the current flowing through the switching transistor Q1 when the power supply is activated, the voltage detected by the resistor R5 is supplied to the base of the control transistor Q2 through the diode D2. Further, the emitter of the control transistor Q2 is connected to the DC input P−.

The auxiliary coil L3 whose one terminal is connected to the DC input P−, is a coil to apply the positive feedback onto the switching transistor Q1. Therefore, the other terminal of the auxiliary coil L3 is guided to the base of the switching transistor Q1 through a diode D1 and a resistor R2 to limit the base current. Further, a capacitor C1 is connected in parallel to the diode D1 so that the turn-off of the switching transistor Q1 is advanced. Further, the other terminal of the auxiliary coil L3 is connected to the base of the control transistor Q2 through a resistor R3.

Further, the other terminal of the auxiliary coil L3 is connected to the collector of the phototransistor Q3 through a serial circuit composed of a capacitor C4 and a resistor R7, and a resistor R8. A diode D3, which serves as a current path to discharge the electric charges accumulated in the capacitor C4, is connected between the connection point of the resistor R7 and the resistor R8, and the DC input P−.

A resistor R9 is an element to increase the current supplied to the base of the control transistor Q2 when the intermittent switching is conducted. That is, the resistor R9 is the element to send out the auxiliary control signal 23 to the base of the control transistor Q2. Therefore, one terminal of the resistor R9 is connected to the other terminal of the auxiliary coil L3. Further, the transistor Q4 is a switch element by which the connection is closed at the time of the intermittent switching. Therefore, the other terminal of the resistor R9 is connected to the emitter of the transistor Q4. The collector of the transistor Q4 is guided to the base of the control transistor Q2, as the auxiliary control signal 23.

A serial circuit composed of the resistor R10 and the diode D4 is connected between the emitter and the base of the transistor Q4 so as to raise the base potential to the emitter potential. Further, the intermittent signal 22 is guided to the base of the transistor Q4 through the resistor R11. Therefore, when the transistor Q4 is turned on, the current sent from the other terminal of the resistor R9 flows to the base of the control transistor Q2 as the auxiliary control signal 23.

The serial circuit composed of the resistor R12 and the resistor R13, and connected between the DC input P+ and the DC input P−, is a voltage dividing circuit to divide the voltage of the DC input P+. The connection point of the resistor R12 and the resistor R13 is guided to the base of the transistor Q5. The diode D5 is an element to take out the negative voltage by rectifying the output of the auxiliary coil L3. Therefore, the cathode of the diode d5 is connected to the other terminal of the auxiliary coil L3.

On the other hand, the capacitor C5 is an element to average the output of the diode D5. Therefore, the anode of the diode D5 is connected to one terminal of the capacitor C5 through the resistor R14. Further, the other terminal of the capacitor C5 is connected to the DC input P−. Further, the connection point of the resistor R14 and the capacitor C5 is connected to the base of the transistor Q5. Further, the emitter of the transistor Q5 is connected to the DC input P− through the diode D6.

The intermittence detection circuit 6 has the structure as described above. Therefore, an addition value of the voltage sent from the connection point of the resistor R12 and the resistor R13, and the output which is outputted from the auxiliary coil L3 when the switching transistor Q1 is off, and is averaged by the capacitor C5, is applied onto the base of the transistor Q5. Accordingly, the voltage applied onto the base of the transistor Q5 becomes a positive level when the negative level voltage generated in the other terminal (path 21) of the auxiliary coil L3 is low, and the transistor Q5 is turned on. On the other hand, when the negative level voltage generated in the path 21 is high in the negative direction, the base potential of the transistor Q5 becomes negative, and the transistor Q5 is turned off.

The anode of the diode D7 is connected to one terminal of the secondary coil L2, and the other terminal of the capacitor C6 whose one terminal is electrically grounded, is connected to the cathode of the diode D7. Further, the other terminal of the secondary coil L2 is electrically grounded. Incidentally, the voltage of the DC output 12 sent from the rectifying and smoothing circuit 2 is about 120 V, and is the operation power supply for the horizontal output circuit of the television set.

A transistor Q6 is an element to detect a voltage error of the DC output 12 and to drive the light emitting diode D8 by the current corresponding to the detected voltage error. Therefore, the reference voltage generated by the Zener diode D9 is applied onto the emitter of the transistor Q6. Further, the output of the voltage dividing circuit which is composed of the resistor R16 and the resistor R17 and divides the voltage of the DC output 12, is applied onto the base of the transistor Q6. Further, the cathode of the light emitting diode D8 is connected to the collector of the transistor Q6, and the anode of the light emitting diode D8 is connected to the DC output 12 through the resistor 15.

The resistor R18 is provided in the error detection circuit 3, and an element to change the voltage dividing ratio of the voltage dividing circuit composed of the resistors R16 and R17. Therefore, one terminal of the resistor R18 is connected to the DC output 12. Further, the other terminal of the resister R18 is guided to the connection point of the resister 16 and the resister 17 through the diode D10. Further, the transistor Q7 is a switch element by which the connection is opened when the voltage dividing ratio is changed, and by which the connection is closed when the voltage dividing ratio is not changed. Therefore, the collector of the transistor Q7 is connected to the other terminal of the resistor R18. Further, the emitter of the transistor Q7 is electrically grounded. The output 13 of the microcomputer to control the operation of the television set is guided to the base of the transistor Q7 through the resister 20 (the resister R19 prevents the base of the transistor Q7 from being opened).

Incidentally, the present embodiment has the structure to send the DC outputs of a plurality of kinds of voltage. Therefore, the secondary coils for other DC outputs are wound around the transformer 1, and the rectifying and smoothing circuits are connected respectively to the secondary coils, however, these secondary coils and rectifying and smoothing circuits are not shown.

Figure 2:
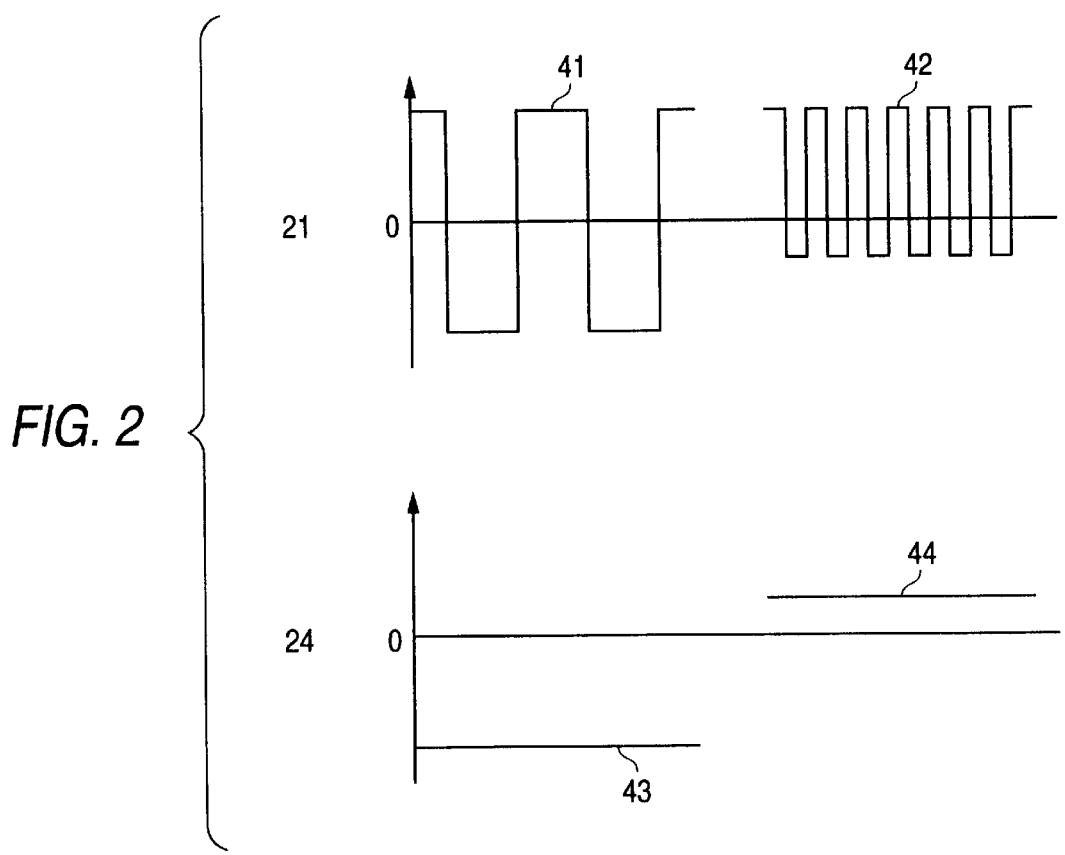
FIG. 2 is an illustrative view showing the changes of the output level of an auxiliary coil and the level of a connection point 24.
Figure 3:
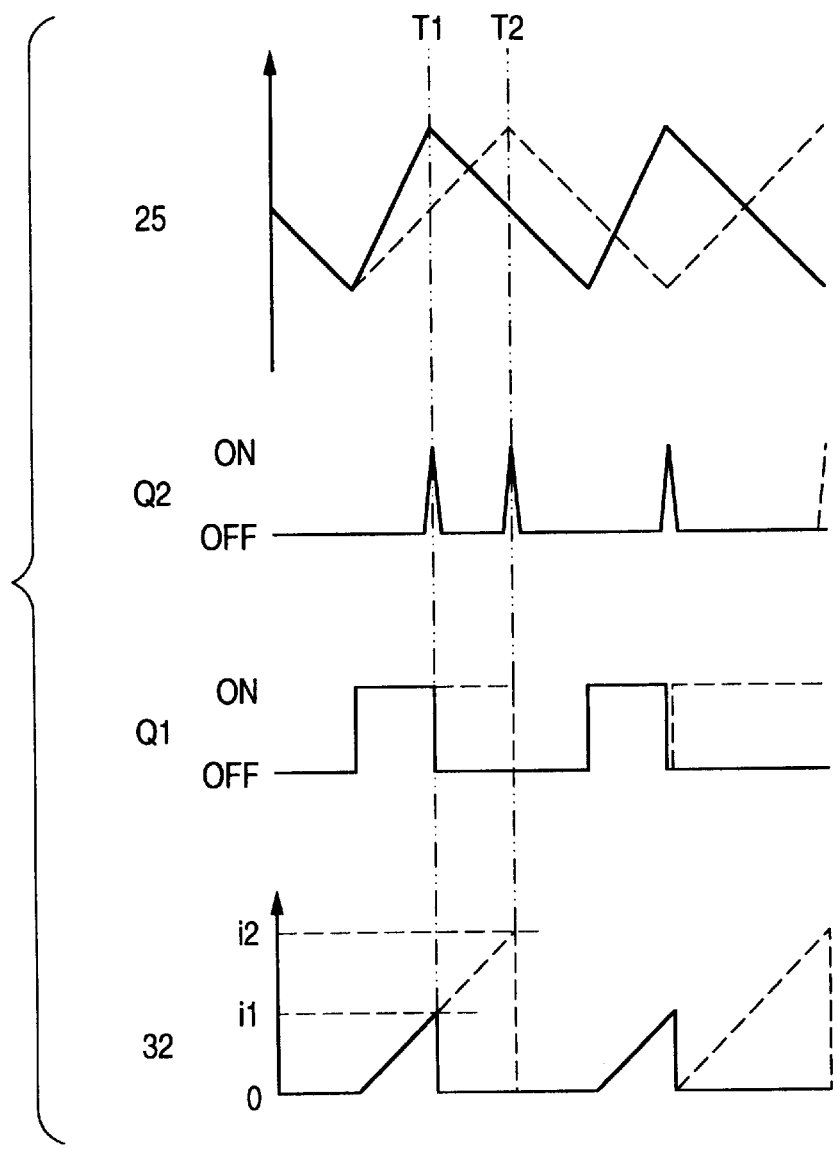
FIG. 3 is an illustrative view showing states of the primary points.

FIG. 2 is an illustrative view showing the changes of the level of the other terminal (path 21) of the auxiliary coil L3 and the level of the base potential of the transistor Q5. FIG. 3 is an illustrative view showing states of the primary points of the embodiment. Referring to these views at need, operations of the embodiment will be described.

When the load is made to conduct a predetermined operation (at the time of normal operation), the output 13 of the microcomputer is set to an H level. Accordingly, the transistor Q7 is turned on, and the collector potential of the transistor Q7 is lower than the base potential of the transistor Q6. Therefore, the resistor 18 is cut off from the base of the transistor Q6. Accordingly, the voltage which is divided by the resistors R16 and R17 is applied onto the base of the transistor Q6. As the result, the light emitting diode D8 is driven by the current corresponding to the voltage error of the DC output 12 corresponding to the rated value (about 120 V). At this time, the change of the voltage sent from the other terminal of the auxiliary coil L3 is shown by 41 of FIG. 2.

On the other hand, when the operation of the television set is on the standby state, the output 13 is set to an L level. Therefore, the transistor Q7 is turned off. As the result, the voltage which is divided by the resistance value of the parallel circuit of the resistor R16 and the resister R18 and the resistance value of the resister R17, is applied onto the base of the transistor Q6. As the result, the switching of the switching transistor Q1 is controlled so that the voltage of the DC output 12 is the voltage of about ⅓ (about 40 V) of the rated value (about 120 V). In this case, because the voltages of the other DC outputs (not shown) are also ⅓, the horizontal oscillation is stopped, and the load current of the DC output 12 is in the vicinity of 0. Then, when the voltage of the DC output 12 is ⅓, and the load current is in the vicinity of 0, the electric power supplied from the primary side is larger than the electric power consumed in the secondary side. As the result, the intermittent switching occurs.

That is, as the result that the load current becomes in the vicinity of 0, the current of the light emitting diode D8 is greatly increased, and the output current of the phototransistor Q3 is also greatly increased. Accordingly, because the base current of the control transistor Q2 is also greatly increased, even when one period of the switching has passed, the control transistor Q2 is kept on due to the influence of electric charges accumulated in the capacitor C2. Therefore, even when one period of the switching has passed, the switching transistor Q1 is not shifted to the on-state. As the result, the switching operation is stopped.

When the switching operation stops, because the voltage of the path 21 becomes 0 V, and the output current of the phototransistor Q3 becomes 0, the control transistor Q2 is shifted to the off-state in a short time. However, even when the control transistor Q2 is shifted to the off-state, the switching transistor Q1 can not be shifted to the on-state at once because the voltage of the path 21 is 0 V. Then, the current flowing through the starting resistor R1 charges the capacitor C3, and when the base potential of the switching transistor Q1 rises to the level on which the current can be circulated to the switching transistor Q1, the switching transistor Q1 is shifted from the off-state to the on-state, and the switching is started again. When a plurality times of switching are conducted, the control transistor Q2 keeps the on-state in the same manner as described above, and the switching is stopped. That is, the intermittent switching occurs.

At the time of the intermittent switching, the voltage of the DC output 12 is stabilized in ⅓ of the rated value. The negative level voltage generated in the path 21 corresponds to the voltage of the DC output 12. Therefore, the change of the voltage generated at the other terminal of the auxiliary coil L3 is the change as shown by 42. That is, the negative level in the path 21 at the time of the intermittent switching is ⅓ of the negative level at the time of the ordinary operation. Accordingly, in the output voltage of the circuit composed of the diode D5 and the capacitor C5, the negative value is not larger than ⅓ (the voltage at the time of switching is ⅓, and at the time of switching stop, it is 0 V. Accordingly, the average value is not larger than ⅓). On one hand, the dividing voltage of the resistors R12 and R13 does not change at the time of ordinary operation and at the time of standby state. Accordingly, because the base potential of the transistor Q5 is on the negative level as shown by 43 at the time of ordinary operation, the transistor Q5 is turned off. On the other hand, at the time of standby state, because the base potential is on the positive level as shown by 44, the transistor Q5 is turned on.

When the transistor Q5 turns on, the transistor Q4 turns on. Accordingly, the current from the resistor R9 flows to the base of the transistor Q2 through the path 23. As the result, the rise-up speed of the base potential of the control transistor Q2 is increased. Accordingly, the timing at which the control transistor Q2 is shifted from the off-state to the on-state, is the advanced timing (shown by T1 in FIG. 3), as compared to the timing when the path of the resistor R9 is not provided (which is the timing according to the output of the error detection circuit 3 and shown by T2).

On one hand, the switching transistor Q1 is shifted from the on-state to the off-state when the control transistor Q2 is shifted from off to on. Accordingly, when the path of the resistor R9 is formed, the switching transistor Q1 is shifted from the on-state to the off-state at the timing T1. On the other hand, the current flowing through the primary coil L1 is temporarily increased. Accordingly, when the switching transistor Q1 is shifted to the off-state at the timing T1, the maximum value i1 of the current flowing through the primary coil L1 is a value which is decreased, as compared to the maximum value i2 when the transistor Q1 is shifted to the off-state at the timing T2.

Figure 4:
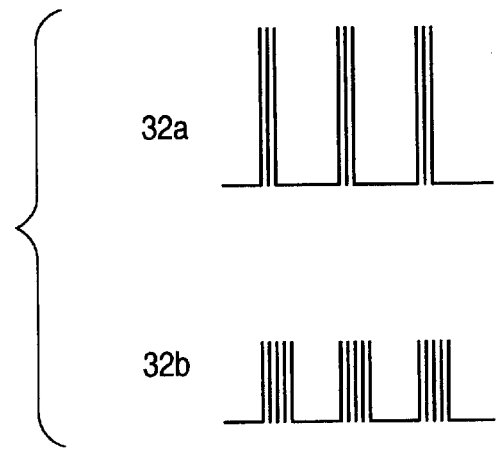
FIG. 4 is an illustrative view showing the change of the current of a primary coil at the time of the intermittent switching.

Reference character 32b in FIG. 4 shows generally the change of the current of the primary coil L1 when the maximum value of the current of the primary coil L1 is i1. That is, when it is compared to the change of the current at the time of intermittent switching when the auxiliary control signal 23 is not sent (the change of the current when the maximum value is i2), the maximum value of the current is limited. Further, the number of times of the switching is increased at each period of the intermittence.

When the maximum value of the current flowing through the primary coil L1 is decreased, because the force to oscillate the transformer 1 is decreased, the sound volume of the oscillation noise generated from the transformer 1 is decreased. Accordingly, the sound volume when the switching transistor Q1 is shifted to the off-state at the timing T1, is a suppressed sound volume, as compared to the sound volume when the switching transistor Q1 is shifted to the off-state at the timing T2. Accordingly, the oscillation noise generated from the transformer 1 becomes a sound volume which is hardly audible when it is heard at the distance on the ordinary operating state. That is, the oscillation noise from the transformer 1 can not be heard.

Figure 5:
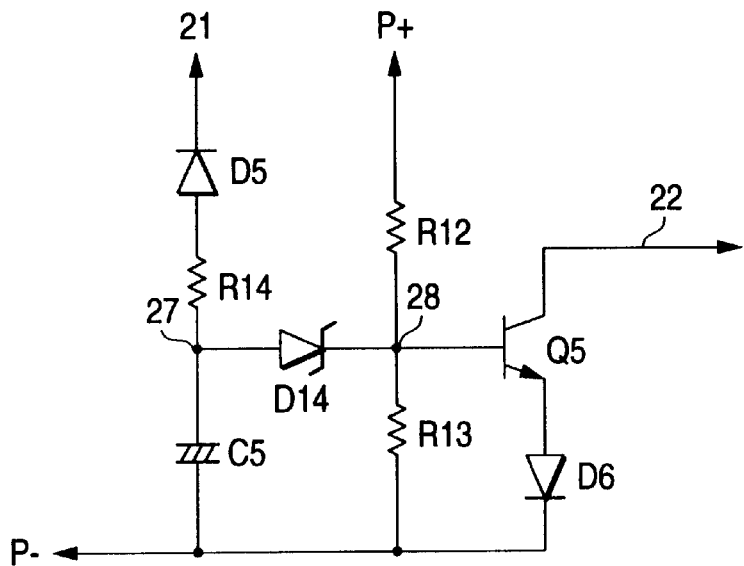
FIG. 5 is a circuit diagram showing the electrical connection of an intermittence detection circuit in a second embodiment.

The second embodiment of the switching power supply according to the present invention will be described below. Incidentally, the second embodiment has the structure in which the step-down instruction circuit 4 is omitted from the first embodiment shown in FIG. 1. Further, the structure of the intermittence detection circuit is changed to the structure shown in FIG. 5. Incidentally, when other portions are shown as the circuit diagram, the structure of the first embodiment is the same as the structure of the second embodiment. Accordingly, in the present embodiment, the voltage of the DC output 12 is controlled so as to be the same at both of the time of ordinary operation and the time of standby state.

The structure of the intermittence detection circuit in the second embodiment will be described below, however, for easy understanding of the relationship of correspondence to the intermittence detection circuit 6 in the first embodiment, elements having the same structure or function are designated by the same reference characters as in FIG. 1.

The structure of the intermittence detection circuit in the present embodiment is the structure in which a Zener diode D14 is added to the intermittence detection circuit 6 shown in FIG. 1. That is, the anode of the Zener diode D14 is connected to the connection point 27 of the resistor R14 and the capacitor C5. Further, the cathode of the Zener diode D14 is connected to the connection point 28 of the resistor R12 and the resistor R13. Accordingly, when the Zener current flows through the Zener diode D14, the voltage of the connection point 28 is maintained at the higher voltage by the Zener voltage than the voltage of the connection point 27.

Figure 6:
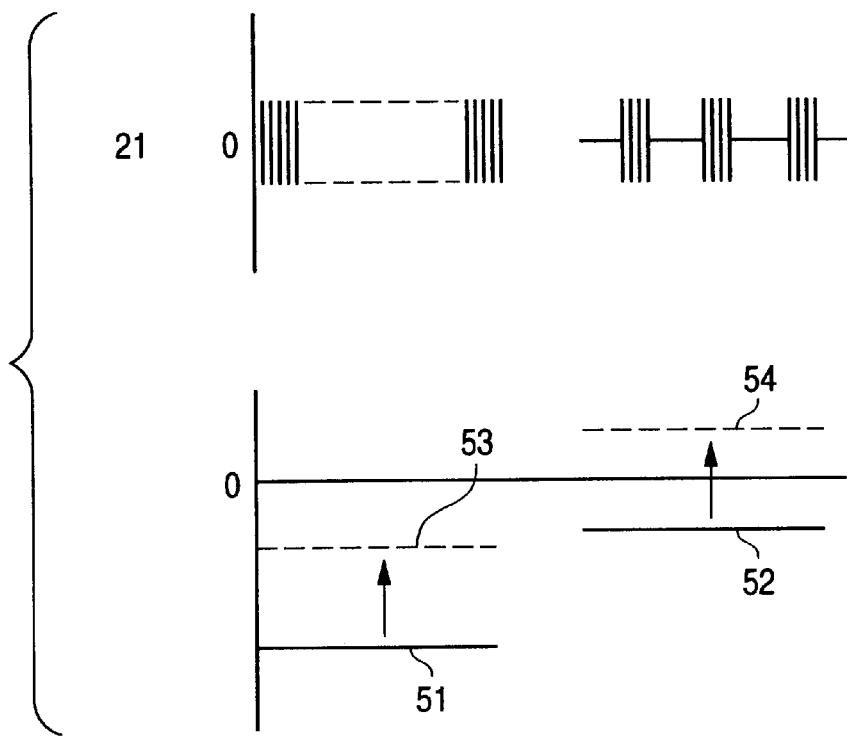
FIG. 6 is an illustrative view showing the changes of the level of the output of the auxiliary coil and the level of connection points 27 and 28.

FIG. 6 is an illustrative view showing the level changes of the primary points in the present embodiment. Referring to the view at need, the operation of the embodiment will be described below.

The switching transistor Q1 conducts the intermittent switching when it is on the standby state and the current of the DC output 12 is in the vicinity of 0, for the same reason as described above. On one hand, the voltage of the connection point 27 is the voltage to which the voltage of the cathode of the diode D5 is averaged. Therefore, the level of the voltage of the connection point 27 is changed when the time ratio in which the path 21 becomes the negative level, changes. On the other hand, when the switching operation is carried out continuously, the time ratio in which the path 21 becomes the negative level is large, and at the time of the intermittent switching, the time ratio in which the path 21 becomes the negative level is small. Accordingly, when the switching operation is carried out continuously at the time of ordinary operation, the voltage of the connection point 27 becomes the voltage in which the negative level is large as shown by 51, however, when the intermittent switching is carried out, the voltage of the connection point 27 becomes the voltage in which the negative level is small as shown by 52.

The voltage of the connection point 28 is the voltage in which the voltage of the connection point 27 is shifted to the positive side by the Zener voltage of the zener diode D14. Accordingly, when the switching operation is carried out continuously, the voltage of the connection point 28 is the voltage (shown by a broken line 53) in which the voltage of the connection point 27 (shown by 51) is shifted by the Zener voltage. Further, when the intermittent switching is carried out, the voltage of the connection point 28 is the voltage (shown by a broken line 54) in which the voltage of the connection point 27 (shown by 52) is shifted by the Zener voltage.

The voltage shown by the broken line 53 is the voltage on the negative level. Accordingly, the transistor Q5 is set to off. Accordingly, because the transistor Q4 is turned off, the auxiliary control signal 23 is not sent out. However, the voltage shown by the broken line 54 is the voltage larger than 0.6 V. Accordingly, the transistor Q5 is set to on. Accordingly, because the transistor Q4 is turned on, the auxiliary control signal 23 is sent out.

That is, when the continuous switching is carried out, the auxiliary control signal 23 is not sent out, and only when the intermittent switching occurs, the auxiliary control signal 23 is sent out. Accordingly, when the auxiliary control signal 23 is sent out, the timing at which the control transistor Q2 is shifted from off to on, is the timing T1 which is advanced from the timing T2 according to the output of the error detection circuit 3. Therefore, the maximum value of the current flowing through the primary coil L1 is i1, and is decreased than the maximum value i2 according to the output of the error detection circuit 3. When the maximum value of the current flowing through the primary coil L1 is decreased, because the force to oscillate the transformer 1 is decreased, the sound volume of the oscillation noise generated from the transformer 1 is decreased. As the result, the oscillation noise from the transformer 1 is not heard.

As described above, when the second embodiment is used, even when the width of the change of the value to which the voltage generated in the other terminal of the auxiliary coil L3 is averaged, is narrowed at the time of continuous switching and at the time of intermittent switching, the on and off operations of the transistor Q5 can be controlled.

Incidentally, the present invention is not limited to the above embodiments, and the structure in which the control of the on and off operations of the transistor Q4 is carried out by the intermittent signal 22 sent from the intermittence detection circuit 6, is described, however, as another structure, for example, by guiding the output of the microcomputer to control the load apparatus to the base of the transistor Q4 through the insulation element such as a photocoupler, the structure to control on/off of the transistor Q4 by using the microcomputer may be allowed.

The switching power supply according to the invention has the structure in which, when the switching transistor conducts the intermittent switching, the maximum value of the current flowing through the primary coil is limited to the current value smaller than the maximum value of the current determined corresponding to the output of the error detection circuit. Accordingly, when the intermittent switching is conducted, because the maximum value of the current flowing through the primary coil is decreased, the force to oscillate the transformer is decreased. As the result, because the sound volume of the oscillation noise generated from the transformer is decreased, even when the oscillation noise of the transformer is in the audio band, the oscillation noise of the transformer can be made to be inaudible.

What is claimed is:

1. A switching power supply comprising:

a switching transistor for switching a current flowing through a primary coil wound around a transformer;

a rectifying and smoothing circuit for rectifying and smoothing an output of a secondary coil wound around the transformer; and an error detection circuit for detecting a voltage error of a DC output sent from the rectifying and smoothing circuit, wherein a voltage of the DC output is stabilized by controlling the switching of the switching transistor according to an output of the error detection circuit, and wherein when the switching transistor conducts an intermittent switching, a maximum value of the current flowing through the primary coil is limited to a current value smaller than a maximum value of a current determined corresponding to the output of the error detection circuit.

2. The switching power supply according to claim 1, wherein the voltage of the DC output is stabilized by controlling an input signal applied onto an input terminal of the switching transistor, by using a control transistor to which the output of the error detection circuit is introduced, and wherein said switching power supply further comprises an auxiliary control circuit for sending an auxiliary control signal to an input terminal of the control transistor at the time of the intermittent switching, and when the auxiliary control signal is applied to the input terminal to which the output of the error detection circuit is introduced, the control transistor changes the timing at which the switching transistor is shifted to off-state, to a timing earlier than a timing determined corresponding to the output of the error detection circuit.

3. The switching power supply according to claim 2, wherein an auxiliary coil for applying a positive feedback onto the switching transistor is wound around the transformer, and a capacitor is connected to the input terminal of the control transistor, and wherein the auxiliary control circuit is provided with a resistor whose one terminal is connected to the auxiliary coil, and when an intermittent signal showing that the intermittent switching is conducted, is supplied, an output sent from the other terminal of the resistor is sent to the input terminal of the control transistor as the auxiliary control signal.

4. The switching power supply according to claim 3, further comprising an intermittence detection circuit for detecting the intermittent switching according to a voltage generated in the auxiliary coil when the switching transistor is turned off and for sending a detection result to the auxiliary control circuit as the intermittent signal.

* * * * *